United States Patent
Trebor-MacConnell et al.

(10) Patent No.: US 9,010,057 B2
(45) Date of Patent: Apr. 21, 2015

(54) SELF-ADHESIVE PANEL AND METHOD

(71) Applicants: Brian K. Trebor-MacConnell, Las Vegas, NV (US); James D. Ablan, Inver Grove Heights, MN (US); Mark J. Libardoni, San Antonio, TX (US)

(72) Inventors: Brian K. Trebor-MacConnell, Las Vegas, NV (US); James D. Ablan, Inver Grove Heights, MN (US); Mark J. Libardoni, San Antonio, TX (US)

( * ) Notice: Subject to any disclaimer, the term of this patent is extended or adjusted under 35 U.S.C. 154(b) by 0 days.

(21) Appl. No.: 14/081,656

(22) Filed: Nov. 15, 2013

(65) Prior Publication Data

US 2014/0137501 A1 May 22, 2014

Related U.S. Application Data

(60) Provisional application No. 61/727,381, filed on Nov. 16, 2012.

(51) Int. Cl.
| | |
|---|---|
| *E04B 2/30* | (2006.01) |
| *B32B 37/26* | (2006.01) |
| *E04F 13/08* | (2006.01) |
| *E04F 13/14* | (2006.01) |
| *B32B 37/12* | (2006.01) |
| *B32B 38/04* | (2006.01) |

(52) U.S. Cl.
CPC ............ *B32B 37/26* (2013.01); *E04F 13/0866* (2013.01); *E04F 13/0885* (2013.01); *E04F 13/141* (2013.01); *B32B 37/12* (2013.01); *B32B 2038/047* (2013.01); *B32B 2607/00* (2013.01)

(58) Field of Classification Search
CPC . E04G 23/0203; E04G 23/0207; E04F 13/04; E04F 13/047
USPC ............... 52/483.1, 514, 514.5, 746.1, 741.4, 52/741.41; 428/40.1, 343
See application file for complete search history.

(56) References Cited

U.S. PATENT DOCUMENTS

| | | | |
|---|---|---|---|
| 5,820,958 A | 10/1998 | Swallow | |
| 6,627,292 B1 | 9/2003 | Hoffmann, Sr. | |
| 7,303,802 B1 | 12/2007 | Brower et al. | |
| 7,971,405 B2 | 7/2011 | Hansen | |
| 2005/0247011 A1 | 11/2005 | Hansen | |
| 2006/0191237 A1 | 8/2006 | Hansen | |
| 2012/0152439 A1 | 6/2012 | Hansen | |
| 2012/0247042 A1 * | 10/2012 | Clancy et al. | ................ 52/309.4 |

OTHER PUBLICATIONS

Drywall Patch, 8×8 Inches, Self Adhesive Tech Spec, Granger Industrial Supply printed Oct. 2, 2012.
Henry The Professional's Formula for Success, www.wwhenry.com.
Liquid Nails Adhesive, Drywall Construction Adhesive, www.liquidnails.com.

* cited by examiner

*Primary Examiner* — Mark Wendell
*Assistant Examiner* — Keith Minter
(74) *Attorney, Agent, or Firm* — Kinney & Lange, P.A.

(57) ABSTRACT

A panel includes a core and a layer of adhesive on top of a core of the panel. A release liner covers the layer of adhesive. The release liner includes segments configured so that any of the segments can be selectively individually removed, exposing corresponding sections of the layer of adhesive.

20 Claims, 6 Drawing Sheets

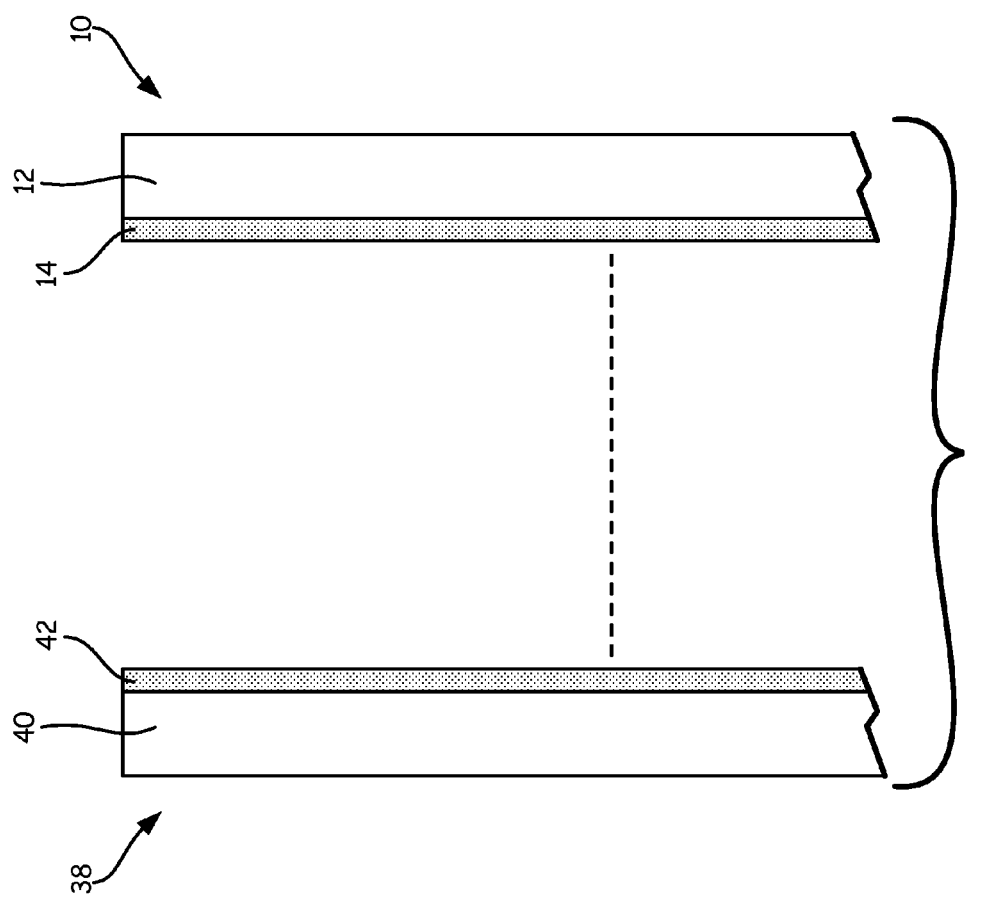

SELF-ADHESIVE PANEL AND METHOD

CROSS REFERENCE TO RELATED APPLICATION(S)

The present invention claims the benefit of U.S. Provisional Application Ser. No. 61/727,381 filed Nov. 16, 2012, which is hereby incorporated by reference as if it were set forth in its entirety.

BACKGROUND

The present invention relates to self-adhesive panels and an associated method.

Traditionally, drywall can be installed using a drywall panel, studs, and screws or nails. Studs are placed with the centers of the studs 16 or 24 inches apart ("on center") on each wall requiring drywall installation. Drywall panels are installed with minimal joints and with the edges of each panel aligned with stud centers. Drywall panels are mounted onto corresponding studs and secured to the studs using nails or screws.

SUMMARY

A panel includes a core and a layer of adhesive on top of a core of the panel. A release liner covers the layer of adhesive. The release liner includes segments configured so that any of the segments can be selectively individually removed, exposing corresponding sections of the layer of adhesive.

An assembly includes studs spaced apart and a panel adhered to the studs. The panel includes a core and a layer of adhesive on top of the core. A release liner covers the layer of adhesive and includes segments configured, sized, and spaced so that any of the segments can be selectively individually removed, exposing corresponding sections of the layer of adhesive for adhering the panel horizontally or vertically onto the studs.

A method includes removing segments of a release liner of a panel to expose segments of adhesive on the panel. The method further includes aligning the panel studs such that the segments of adhesive are facing the studs and adhering the panel to the studs.

A method of manufacturing includes applying an adhesive to a panel, applying a release liner on top of the adhesive, and perforating the release liner to define removable segments.

BRIEF DESCRIPTION OF THE DRAWINGS

FIG. 6 is an exploded side view of installation of a drywall panel using a two part adhesive.

DETAILED DESCRIPTION

In general, a panel of the present invention is typically made from a core, base, or body of gypsum or another material but can be made of other materials based on applications such as fireproofing and bathroom installation where moisture is a greater concern. For instance, the panel can be drywall, plasterboard, wallboard, sheetrock, gypsum board, plywood, DensGlass® fiberglass mat gypsum panels (available from Georgia-Pacific Gypsum LLC, Atlanta, Ga.), or other type of rigid panel. The drywall panel can be ½ inch thick or ⅝ inch thick, based on commercial or residential application. One or more sides of the drywall panel can be covered with paper (or other materials) like standard drywall panels. One side of the drywall panel includes a layer of adhesive on top of the paper (if any), the adhesive covered by a release liner, eliminating the need for coating the drywall panel with adhesive prior to installation. In a preferred embodiment, the release liner is segmented or perforated such that it can be removed in sections, exposing corresponding sections of adhesive underneath.

Adhesive layered on the drywall panel of the present invention can be contact cement, construction adhesive such as PL 200 (manufactured by Henkel of Westlake, Ohio), liquid glue, or any other suitable adhesive, glue, cement or building material. Adhesive used with the drywall panel of the present invention can be one part, where the only adhesive used is the layer on the drywall panel itself. In an alternative embodiment, a two part adhesive (or cement) can be used, with adhesive both on the drywall panel and on the installation location (e.g. on the studs) of the wall on which the drywall panel is installed.

Figure 1:
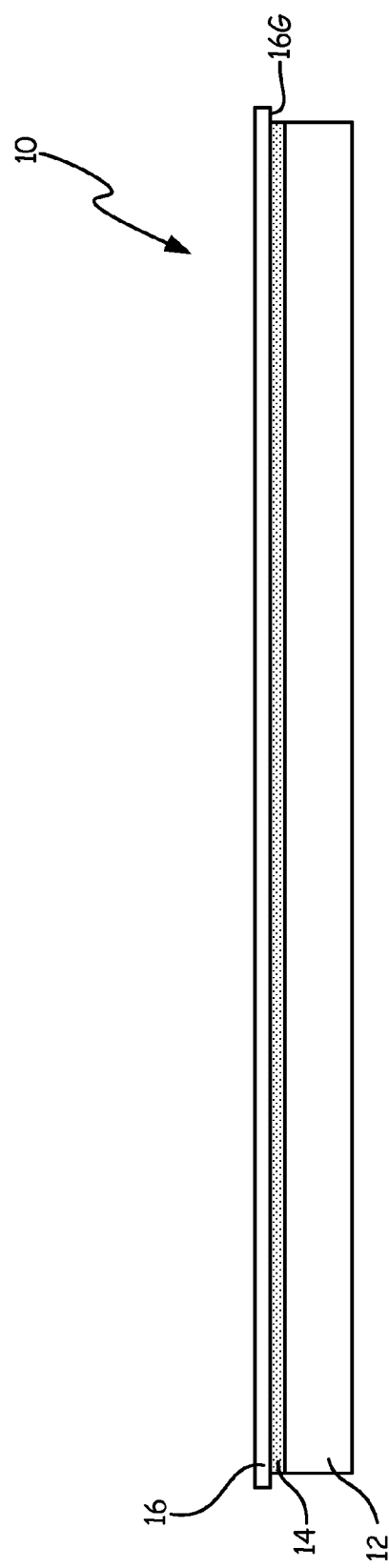
FIG. 1 is a side view of an embodiment of a drywall panel according to the present invention.

FIG. 1 is a side view of one embodiment of drywall panel 10. Drywall panel 10 is primarily made of gypsum board 12. Gypsum board 12 is typically covered by a paper layer on both sides with gypsum in between the two paper layers. For simplicity, the paper layers are not specifically delineated. Gypsum board 12 is covered by a layer of adhesive 14. Adhesive 14 is covered by release liner 16. Release liner 16 of drywall panel 10 extends past adhesive 14 and gypsum board 12 for ease of installation. In one embodiment, release liner 16 extends past adhesive 14 and gypsum board 12 by a desired amount, such as ¼ of an inch, which provides a gripping surface 16G that allows a person installing drywall panel 10 to pull on the extended portion of release liner 16 to remove release liner 16 and expose at least a portion of adhesive 14.

Figure 2:
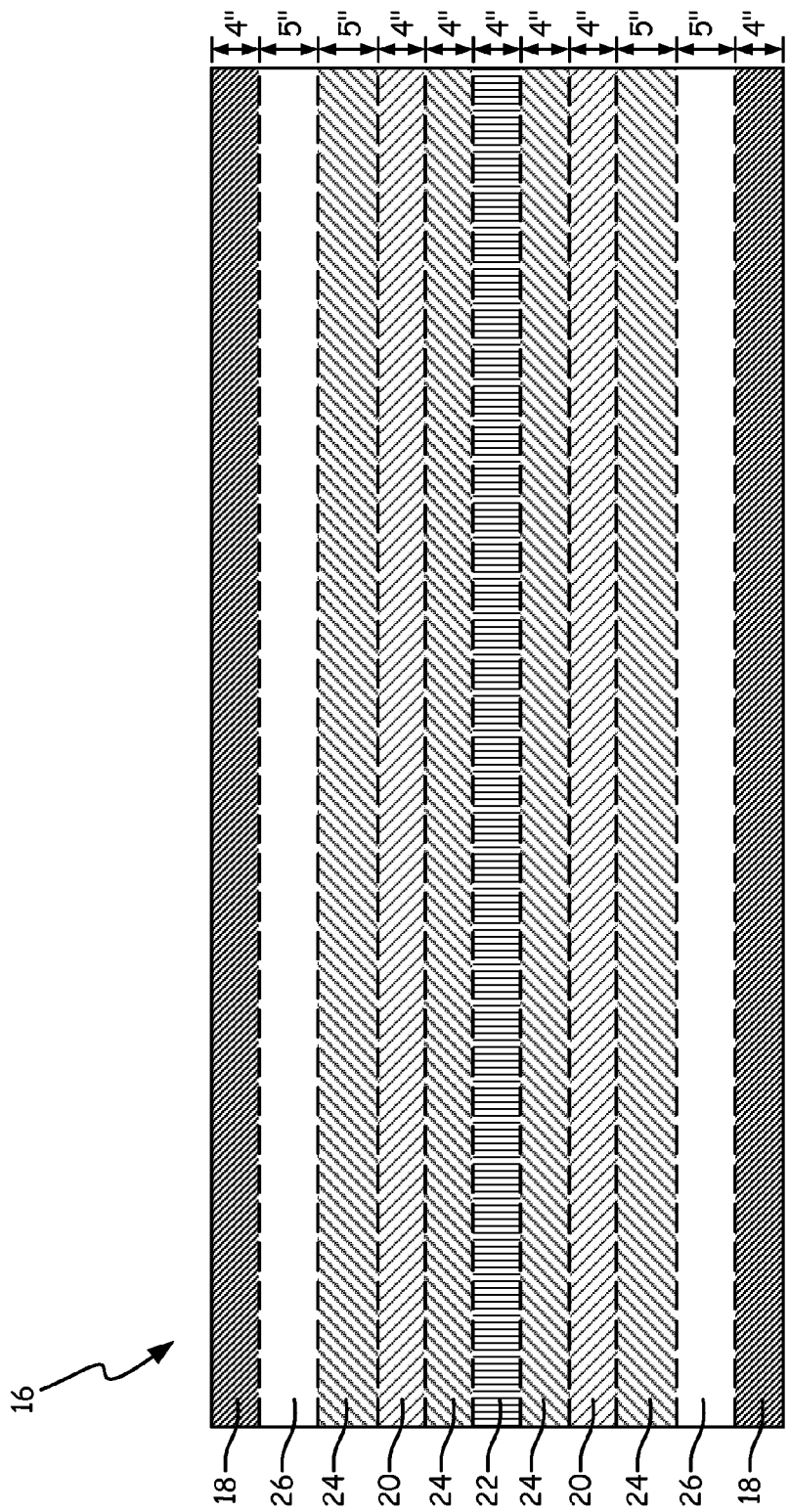
FIG. 2 is a front view of a first embodiment of a release liner of a drywall panel.

FIG. 2 is a front view of a first embodiment of release liner 16 of drywall panel 10. Release liner 16 includes tabs 18, 20, 22, 24, and 26. Tabs 18, 20, 22, 24, and 26 are sized, spaced, and coded such that drywall panel 10 can be installed horizontally or vertically by selectively removing individual tabs to expose desired portions of adhesive 14. Tabs 18, 20, and 22 can each be 4 inches wide. In between tabs 18 and 20, tabs 24 and 26 can each be 5 inches wide. In between tabs 20 and 22, tabs 24 can each be 4 inches wide. Tabs 18 are generally removed for installation whether drywall panel 10 is installed horizontally or vertically, and regardless of stud spacing. Tabs 20 and tabs 18 are removed when drywall panel 10 is installed vertically onto a wall with studs that are 16 inches on center. Tab 22 and tabs 18 are removed when drywall panel 10 is installed vertically onto a wall with studs that are 24 inches on center. Remaining tabs can be left in place for installation. Tabs 24 and tabs 18 are removed when drywall panel 10 is installed horizontally onto a wall with studs that are either 16 inches or 24 inches on center. In an alternative embodiment, when drywall panel 10 is installed horizontally and vertically, if needed, tabs 18, 20, 22, 24, and 26 can all be removed, exposing all of adhesive 14.

Drywall panel 10 can be manufactured starting with a typical drywall panel, such as gypsum board 12 of FIG. 1. Gypsum board 12 is typically covered by a paper or polymer film layer on both sides with gypsum in between the two paper or polymer film layers. Adhesive 14 can then be pre-applied to gypsum board 12 on top of one of the paper or polymer film layers. Release liner 16 is then applied on top of adhesive 14. Release liner 16 can be pre-perforated or pre-segmented prior and subsequently applied on top of adhesive 14. In an alternative embodiment, release liner 16 can be perforated or segmented after release liner 16 is applied on top of adhesive 14. The perforations in release liner 16 define tabs, such as tabs 18, 20, 22, 24, and 26 as shown in FIG. 2. Each tab can be color-coded, signifying when it is appropriate to remove the tab during horizontal or vertical installation of drywall panel 10.

Figure 3:
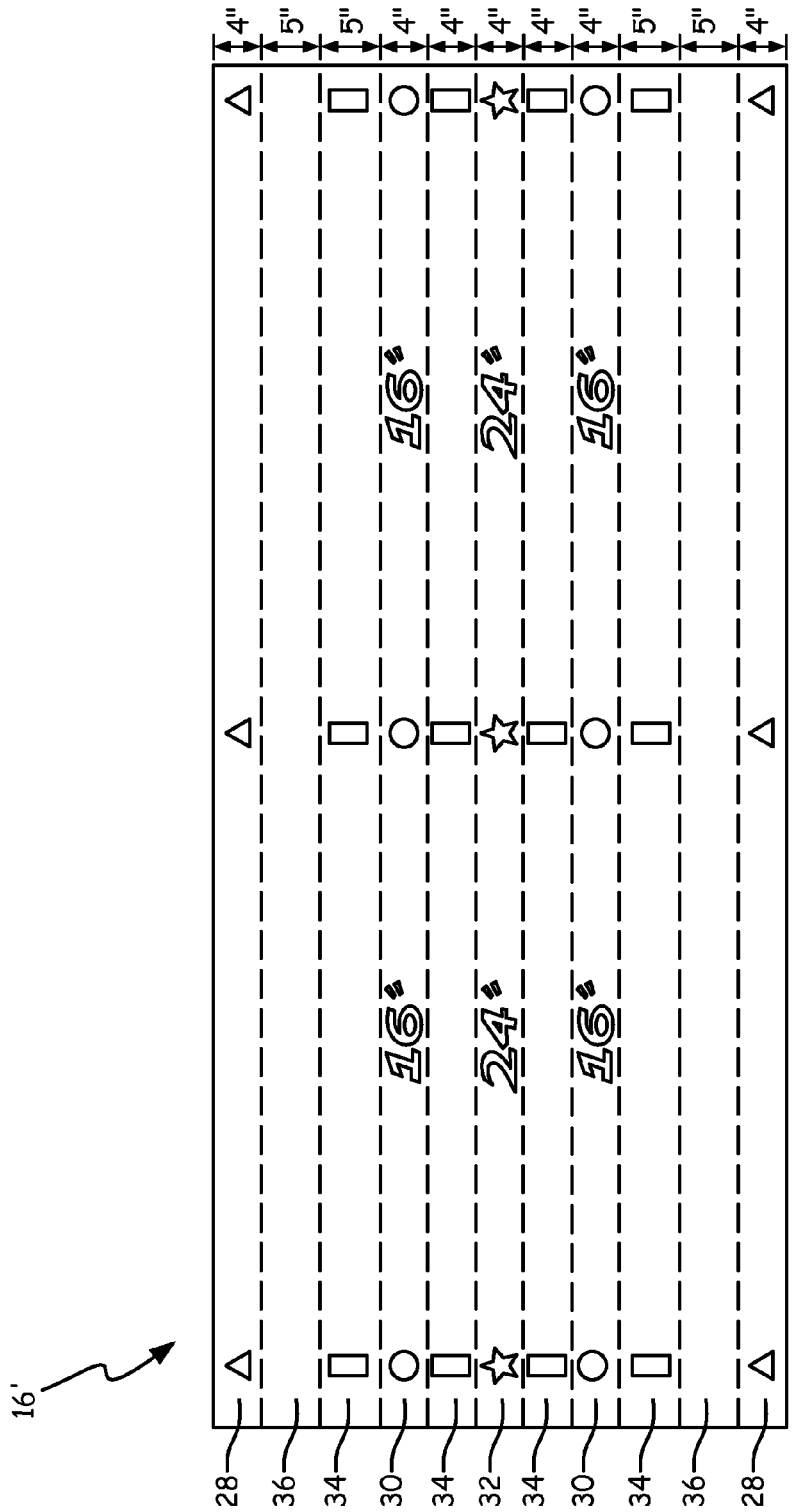
FIG. 3 is a front view of a second embodiment of a release liner of a drywall panel.

FIG. 3 is a front view of a second embodiment of release liner 16' of drywall panel 10. Release liner 16' includes tabs 28, 30, 32, 34, and 36. Tabs 28, 30, 32, 34, and 36 are sized, spaced, and marked with symbols such that drywall panel 10 can be installed horizontally or vertically by selectively removing individual tabs to expose desired portions of adhesive 14. Tabs 28, 30, and 32 can each be 4 inches wide. In between tabs 28 and 30, tabs 34 and 36 can each be 5 inches wide. In between tabs 30 and 32, tabs 34 can each be 4 inches wide. The symbols marked on tabs 28, 30, 32, 34, and 36 are for illustration purposes only. Tabs 28, 30, 32, 34, and 36 can be marked with symbols, Arabic numerals corresponding to stud spacing dimensions (such as the Arabic numerals shown on tabs 30 and 32), and/or any suitable visual indicia or tactile indicia (such as Braille).

Tabs 28 are marked with triangles and are removed whether drywall panel 10 is installed horizontally or vertically. Tabs 30 are marked with circles and are removed in addition to tabs 28 when drywall panel 10 is installed vertically onto a wall with studs that are 16 inches on center. Tab 32 is marked with a star and is removed in addition to tabs 28 when drywall panel 10 is installed vertically onto a wall with studs that are 24 inches on center. Tabs 34 are marked with a rectangle and are removed when drywall panel 10 is installed horizontally onto a wall with studs that are either 16 inches or 24 inches on center. In an alternative embodiment, when drywall panel 10 is installed horizontally, tabs 28, 30, 32, 34, and 36 can all be removed, exposing all of adhesive 14.

Drywall should be installed with as few joints as possible, therefore depending on the shape and size of the wall, vertical or horizontal installation can be more appropriate. For vertical installation, the layout of the wall should be checked to determine the distance between the centers of studs, for example whether studs are 16 inches or 24 inches on center. For walls taller than 10 feet, horizontal bridging between studs should be installed to keep studs on center. Prior to installing drywall panel 10, drywall panel 10 is measured to see if drywall panel 10 will line up with the center of a stud. If drywall panel 10 does not line up, drywall panel 10 is cut to line up with a center of the nearest stud. Once drywall panel 10 is aligned with the center of a stud, that stud is the layout stud.

Figure 4:
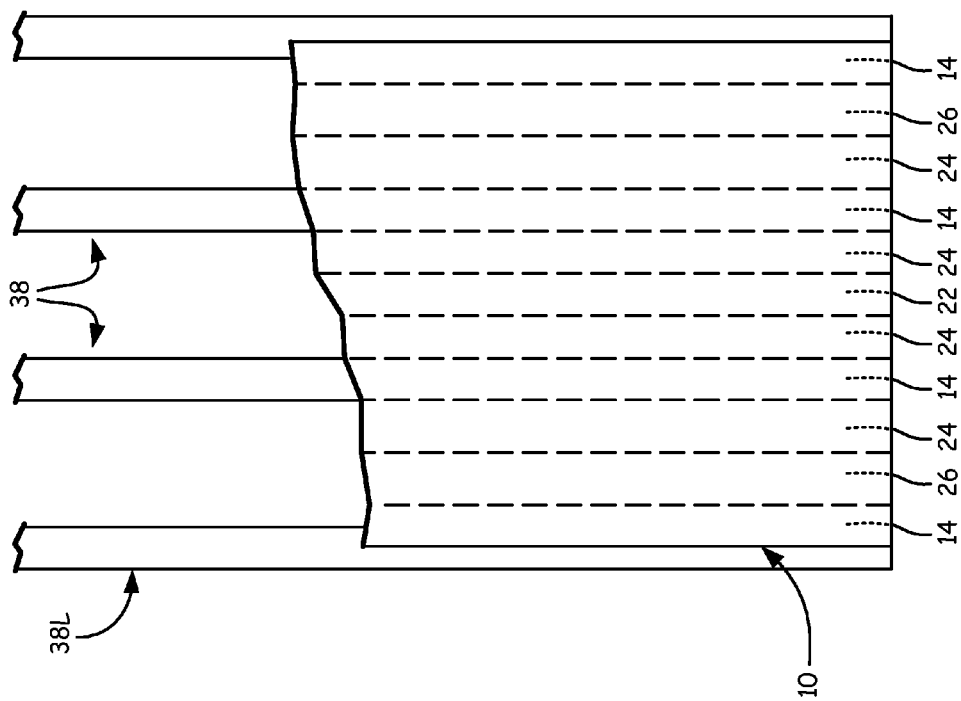
FIG. 4 is a front view of a drywall panel installed vertically on studs.

After drywall panel 10 is properly measured, tabs 18 are removed regardless of stud spacing. If drywall panel 10 is cut such that one of tabs 18 is no longer on drywall panel 10, remaining tab 18 and whichever tab (20, 22, 24, or 26) is nearest the cut edge are removed. If a wall contains studs 38 that are 16 inches on center, tabs 20 and tabs 18 are removed, as shown in FIG. 4. If a wall contains studs 38 that are 24 inches on center, tab 22 and tab 18 are removed. Drywall panel 10 now contains exposed sections of adhesive 14 that line up in parallel with studs onto which drywall panel 10 is mounted. The exposed sections of adhesive 14 can be discontinuous, that is, separated by tabs that remain in contact with adhesive 14.

Drywall panel 10 can be carried over to the wall and stood up at a distance (e.g. 1 to 2 inches or 3 to 4 inches) away from the wall. If drywall panel 10 is installed on a wall from left to right, the left edge of drywall panel 10 is the leading edge. If drywall panel 10 is installed from right to left, the right edge of drywall panel 10 is the leading edge. The leading edge of drywall panel 10 should be aligned on and in contact with the wall such that drywall panel 10 is snug to any adjacent wall, stud, or sheetrock. The rest of drywall panel 10 is then pressed against the wall with, in one embodiment, at least 45 pounds of pressure while ensuring that the outside edge of drywall panel 10 is in the center of the layout stud. Once one drywall panel 10 is installed, additional drywall panels 10 are installed along the length of the wall in the same manner until the wall is adequately covered. Fasteners, such as nails or screws, can optionally be attached to further secure drywall panel 10; however, such fasteners are made unnecessary by adhesive 14.

FIG. 4 is a front view of an embodiment of drywall panel 10 having release liner 16, with drywall panel 10 shown broken away to reveal studs 38. Drywall panel 10 is installed vertically on studs 38. Studs 38 are spaced 16 inches on center. Tabs 18 and 20 have been removed from drywall panel 10 to reveal adhesive 14. Drywall panel 10 is aligned with the center of layout stud 38L such that adhesive 14 binds drywall panel 10 to studs 38, with adhesive 14 aligned in parallel with studs 38. Adhesive 14 may be in continuous contact with studs 38 along substantially an entire length of drywall panel 10.

For horizontal installation from the ground up, the highest point of the floor in front of the wall is found using a laser level taking measurements every ten feet. The stud closest to the highest point of the floor should be marked at 48.5 inches. That stud is then used as a reference point to measure off a level laser line and mark the rest of the studs. This ensures that when drywall panel 10 is installed, drywall panel 10 stays on center of the studs. Once the rest of the studs are marked, a level line is drawn across all of the studs, such as using a chalk line. A guide bar can be installed along the top of the line to more easily align drywall panel 10 on studs. After the wall is properly marked, drywall panel 10 is measured to see if drywall panel 10 will line up with the center of a stud. If drywall panel 10 does not line up, drywall panel 10 is cut to line up with the center of a stud. Once drywall panel 10 is aligned with the center of a stud, that stud is the layout stud.

After drywall panel 10 is properly measured, tabs 18 are removed. If drywall panel 10 is cut such that one of tabs 18 is no longer on drywall panel 10, remaining tab 18 and whichever tab (20, 22, 24, or 26) is nearest the cut edge are removed. Tabs 24 are also removed. The exposed sections of adhesive 14 can be discontinuous, that is, separated by tabs that remain in contact with adhesive 14. In an alternative embodiment (not shown), all tabs (18, 20, 22, 24, and 26) are removed, exposing all of adhesive 14.

Once the tabs are removed and the desired sections of adhesive 14 are exposed, drywall panel 10 can be carried over to the wall and stood up at a distance (e.g. 1 to 2 inches or 3 to 4 inches) away from the wall. A person should stand on each end of drywall panel 10 and lift drywall panel 10 such that the top edge of drywall panel 10 leans toward the wall. Drywall panel 10 is then aligned with the chalk line or guide bar and should be snug to any adjacent wall, stud, or sheetrock. When drywall panel 10 is properly aligned, the top edge of drywall panel 10 is pressed into the studs. The rest of drywall panel 10 is subsequently pressed into the wall, applying, for example, greater than or equal to 45 pounds of pressure from the top edge down, ensuring that the vertical edge of drywall panel 10 is aligned on the center of the layout stud. Once one drywall panel 10 is installed, additional drywall panels 10 are installed along the length of the wall adjacent to the first drywall panel 10.

After the bottom row of drywall panels 10 is installed, a second row of drywall panels 10 is installed above the bottom row. In order to stagger vertical joints, the first drywall panel 10 installed in the second row should be cut such that the first drywall panel 10 aligns with the center of the stud that is closest to the center of the first drywall panel 10 installed in the bottom row; this is the layout stud. The desired tabs on the first drywall panel 10 in the second row are unzipped (i.e., removed) and drywall panel 10 is installed aligning the bottom edge with the top edge of the panel underneath drywall panel 10 and ensuring that drywall panel 10 is snug to any adjacent wall, stud, or sheetrock. Drywall panel 10 in the second row is then installed from the bottom up, pressing the bottom edge into the wall and working up drywall panel 10, applying, for example, greater than or equal to 45 pounds of pressure and ensuring that the vertical edge is aligned on the center of the layout stud. Additional drywall panels 10 are installed along the length of the wall adjacent to the first drywall panel 10 in the second row. If necessary, subsequent rows of drywall panels 10 are installed above the second row until the wall is covered in drywall panels 10 as desired.

Drywall panel 10 can also be horizontally installed on exterior framing. 48 inch increments are measured from the roof edge down at both ends of the building. A reference line is made using a chalk line, and a guide bar should be installed on the bottom side of the chalk line. Drywall panel 10 is measured to see if drywall panel 10 will line up with the center of a stud. If drywall panel 10 does not line up, drywall panel 10 is cut to line up with the center of the nearest stud. Once drywall panel 10 is aligned with the center of a stud, that stud is the layout stud. After drywall panel 10 is properly measured, tabs 18 are removed. If drywall panel 10 is cut such that one of tabs 18 is no longer on drywall panel 10, remaining tab 18 and whichever tab nearest the cut edge are removed. Tabs 24 are also removed. In an alternative embodiment, all tabs are removed, exposing all of adhesive 14.

After the tabs are removed and the desired sections of adhesive 14 are exposed, two people can each lift one end of drywall panel 10 while leaning the top edge of drywall panel 10 away from the wall slightly. The bottom edge of drywall panel 10 should be aligned on the guide bar while ensuring that drywall panel 10 is snug to any adjacent wall, stud, or sheetrock. The bottom edge of drywall panel 10 is then pressed on to the wall, and the rest of drywall panel 10 is subsequently pressed into the wall from the bottom up and with, for example, greater than or equal to 45 pounds of pressure. To ensure maximum holding strength, fasteners, such as nails or screws can be installed around the perimeter of drywall panel 10. Additional drywall panels 10 are installed along the length of the wall adjacent to the first drywall panel 10. Subsequent rows of drywall panels 10 are installed until the wall is covered in drywall panels 10 as desired.

Figure 5:
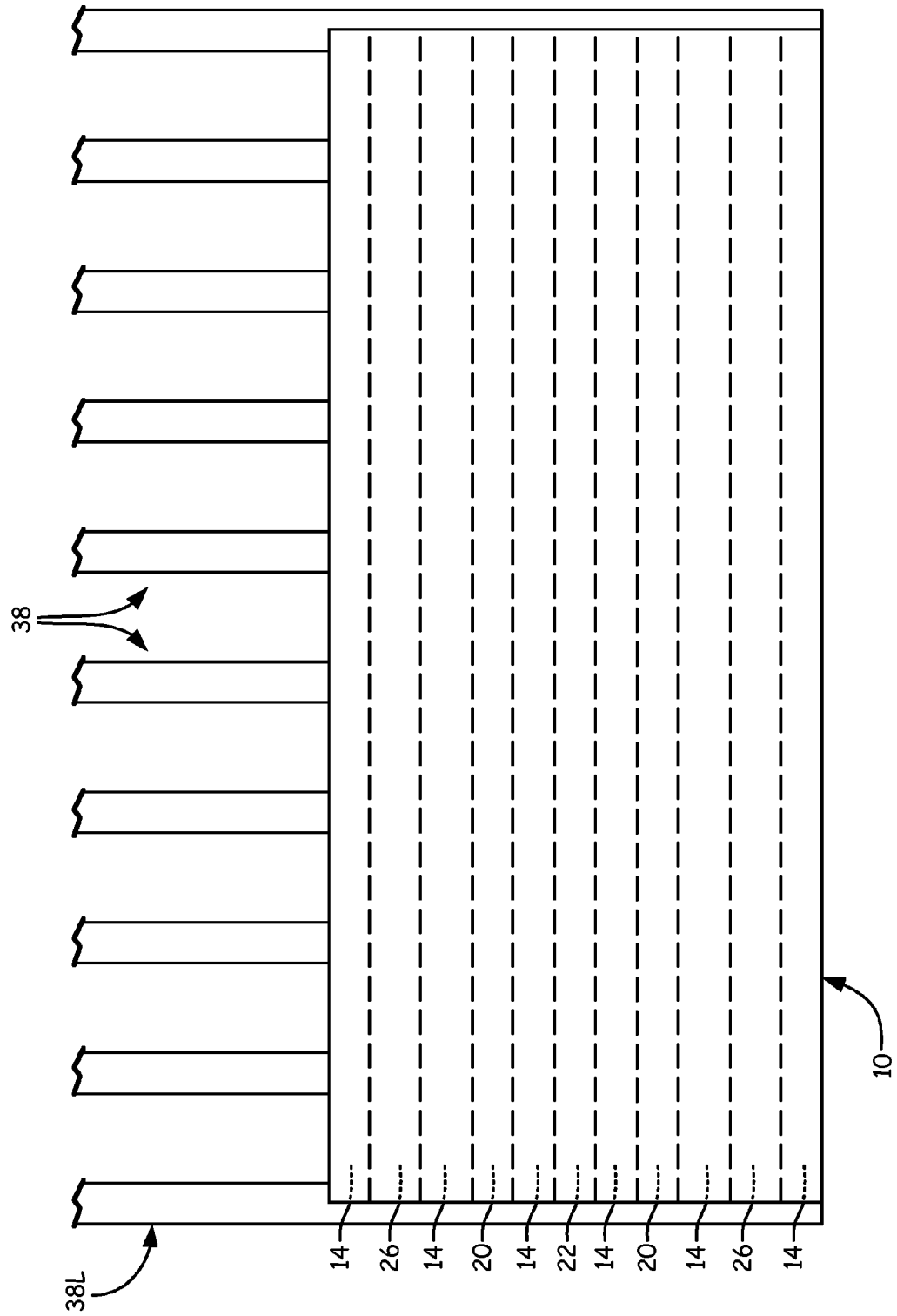
FIG. 5 is a front view of a drywall panel installed horizontally on studs.

FIG. 5 is a front view of drywall panel 10 having release liner 16, with drywall panel 10 shown broken away to reveal studs 38. Drywall panel 10 is installed horizontally on studs 38. Tabs 18 and 24 have been removed from drywall panel 10 to reveal adhesive 14. Drywall panel 10 is aligned with the center of layout stud 38L. Adhesive 14 binds drywall panel 10 to studs 38. Adhesive 14 is substantially perpendicular to studs 38.

FIG. 6 is an exploded side view of installation of drywall panel 10 using a two part adhesive such as contact cement, one part of which is on drywall panel 10 and the other part of which is on stud 38. Drywall panel 10 includes gypsum board 12 and adhesive 14 from which the appropriate portion of release liner 16 has been removed. The paper of gypsum board 12 is not shown for simplicity. Stud 38 includes two-by-four 40 and adhesive 42, which is applied to stud 38 prior to installation of drywall panel 10. Drywall panel 10 is mounted onto stud 38 such that adhesive 14 and adhesive 42 are in contact. Subsequently, at least 45 pounds of pressure is applied to drywall panel 10 such that adhesive 14 and adhesive 42 are sufficiently bonded, securing drywall panel 10 to stud 38.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims. Moreover, features or steps described with respect to one embodiment can be readily utilized in conjunction with another embodiment, as desired for particular applications.

The invention claimed is:

1. A panel comprising:
   a core;
   a layer of adhesive on top of the core; and
   a release liner covering the layer of adhesive, the release liner comprising:
      a plurality of segments configured so that any of the segments can be selectively individually removed, exposing corresponding sections of the layer of adhesive,
      wherein one or more of the plurality of segments is marked with an indicium corresponding to sizing and spacing of the plurality of segments of the release liner to indicate which of the plurality of segments are removed to install the panel horizontally or vertically onto a plurality of studs that are spaced apart.

2. The panel of claim 1, wherein the adhesive is a one part adhesive or a component of a multi-part adhesive.

3. The panel of claim 2, wherein the adhesive is selected from the group consisting of contact cement, construction adhesive, and liquid glue.

4. The panel of claim 1, wherein the core comprises at least one of gypsum, plywood, and fiberglass.

5. The panel of claim 1, wherein each of the plurality of segments of the release liner is marked with an indicium corresponding to stud spacing dimensions.

6. The panel of claim 1, wherein the release liner extends past the adhesive to provide a gripping surface.

7. The drywall panel of claim 1, wherein the release liner is perforated between adjacent segments.

8. The drywall panel of claim 1, wherein the plurality of segments of the release liner comprises a plurality of segment pairs having different widths.

9. An assembly comprising:
   a plurality of studs spaced apart; and
   a panel adhered to the plurality of studs, the panel comprising:
      a core;
      a layer of adhesive on top of the core; and
      a release liner covering the layer of adhesive, the release liner comprising:

a plurality of segments configured, sized, and spaced so that any of the segments can be selectively individually removed, exposing corresponding sections of the layer of adhesive for adhering the panel horizontally or vertically onto the plurality of studs, wherein one or more of the plurality of segments of the release liner is marked with an indicium corresponding to stud spacing dimensions.

10. The panel of claim 9, wherein the plurality of segments of the release liner is removed such that the exposed corresponding sections of adhesive align in parallel with the plurality of studs.

11. The panel of claim 9, wherein the plurality of segments of the release liner is removed such that the exposed corresponding sections of adhesive are in continuous contact with the plurality of studs along substantially an entire length of the panel.

12. The panel of claim 11, wherein select segments of the plurality of segments of the release liner remain in contact with the adhesive such that the adhesive is not exposed in between the plurality of studs.

13. The panel of claim 9, wherein the plurality of segments of the release liner is removed such that the exposed corresponding sections of adhesive are substantially perpendicular to the plurality of studs when the panel is installed horizontally.

14. The panel of claim 13, wherein the exposed corresponding sections of adhesive are separated by select segments of the release liner that remain in contact with the adhesive.

15. A method comprising:
   identifying a plurality of segments of a release liner of a panel for removal based on an indicium signifying which of the plurality of segments to remove to install the panel horizontally or vertically onto a plurality of studs;
   removing the plurality of identified segments of the release liner to expose a plurality of segments of adhesive on the panel;
   aligning the panel with the plurality of studs such that the plurality of segments of adhesive are facing the studs; and
   adhering the panel to the plurality of studs.

16. The method of claim 15, wherein the plurality of segments of the release liner is removed such that the exposed corresponding sections of adhesive are in continuous contact with the plurality of studs along substantially an entire length of the panel.

17. The method of claim 15, wherein select segments of the plurality of segments of the release liner remain in contact with the adhesive such that the adhesive is not exposed in between the plurality of studs.

18. A method of manufacturing comprising:
   applying an adhesive to a rigid panel;
   applying a release liner on top of the adhesive;
   perforating the release liner to define a plurality of removable segments; and
   marking one or more of the plurality of segments of the release liner with an indicium signifying which of the plurality of segments are removed to install the panel horizontally or vertically onto a plurality of studs.

19. The method of claim 18, wherein the release liner is perforated prior to applying the release liner on top of the adhesive.

20. The method of claim 18, wherein the release liner is perforated after applying the release liner on top of the adhesive.

* * * * *